May 15, 1962     G. T. BROWN     3,034,357
FLUID PRESSURE OPERATED DEVICES

Filed July 15, 1959     2 Sheets-Sheet 1

Inventor
George T. Brown
By Edward L. Amonette
Agent

May 15, 1962    G. T. BROWN    3,034,357
FLUID PRESSURE OPERATED DEVICES
Filed July 15, 1959    2 Sheets-Sheet 2

Inventor
George T. Brown
By Edward L. Amonette
Agent

United States Patent Office 3,034,357
Patented May 15, 1962

3,034,357
FLUID PRESSURE OPERATED DEVICES
George T. Brown, Albuquerque, N. Mex.
(2815 Flower St., Huntington Park, Calif.)
Filed July 15, 1959, Ser. No. 827,351
4 Claims. (Cl. 73—407)

The present invention relates to fluid pressure operated devices, and more particularly this invention relates to mechanisms which utilize fluid pressure changes to operate indicators, recorders, controls and/or actuators, or any combination of these, as may be desired. The term "fluid" as used in this specification and appended claims includes any gas or liquid.

The present invention contributes to the art to which this invention pertains by providing a simple and inexpensive device for deriving the difference between two or more fluid pressures, or the sum of two or more fluid pressures, as well as many other applications now fulfilled only by complicated and expensive devices or not provided for at all by any other means known.

One object of the present invention then is to provide a device which will effectively and accurately measure fluid pressure differentials or summations and which will be of simple design and economical to manufacture.

Another object of the present invention is to provide a device of the character described which will have only slight movement of the mechanical parts thereof and which will therefore be extremely long lived.

Still another object of the present invention is to provide a device of the character described which may be mounted in any desired position and still maintain its accuracy.

Yet another object of the present invention is to produce a device of the character described which is easily producible and in which additional like parts may be added to enable the user to measure pressure differentials and summations from many different points. Other devices previously used for sensing and indicating dfferental and summation pressures have included complicated mechanisms usually characterized by elaborate balancings of hydraulic pressures against springs provided in the device. The present device, however, needs no springs other than that provided in a pressure gauge and is of simple construction employing only a few parts, all of which may be inexpensively manufactured and easily maintained.

Yet another object of the present invention is to provide a device of the character described which is temperature compensating within the stroke of the piston.

Still another object of the present invention is to provide a device of the character described which may be equipped with either integral or outside plumbing to protect it against over pressure or reverse pressure or for controlling differential or summation pressures.

Still another object of the present invention is to provide a device of the character described which provides for very little or no leakage losses and a device in which friction losses will be negligible due to its new and novel design.

Yet another object of the present invention is to provide a device of the character described which is very useful in measuring extremely high pressures since the piston seals of the device need only withstand the differential pressure, applied to the device.

With the above and other objects in view as will appear as the description proceeds, the present invention resides in the new and novel construction, combination and arrangement of parts, as hereinafter more specifically set forth, claimed and shown in the accompanying drawings which form a part of this application for letters patent.

In the accompanying drawings are illustrated preferred and practical embodiments of the invention, it being understood, however, that the drawings are merely illustrative and the inventive-concept is susceptible of other embodiments and utilizations, and that the illustrated embodiments likewise are susceptible of a wide range of variation and modification without departing from the spirit of the invention or the scope of the appended claims.

In the drawings which accompany and form a part of this specification, and in which like reference numerals are used to designate the same or like parts throughout the several figures.

Figure 1:
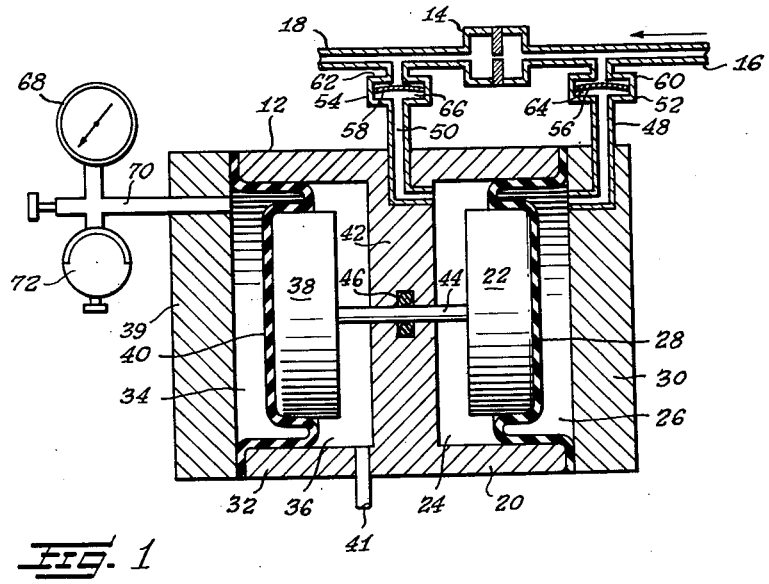
FIG. 1 illustrates a cross-sectional view of a simple form of my invention.

The invention will be more clearly understood from the following description in conjunction with the above drawings, and from these it will be seen that this invention consists essentially of two or more co-axial closed pressure chambers fitted with movable walls, pistons or plungers and so arranged that a pressure may be applied to opposite sides or ends of the movable element or elements.

Referring now in detail to the drawings and first adverting to that form of the invention shown in FIG. 1, the device of the present invention has been generally designated by the reference numeral 12, and while this device has been shown and will be described as being cylindrical in shape it is to be understood that it may be of any desired shape or size, and also that it may be made from any suitable material, such as, for example, metal, glass, plastic, wood, rubber or any other suitable material as desired. The device shown in FIG. 1 has been illustrated in conjunction with an object 14 which may be, for example, a filter element or a venturi device or any other object the use of which results in a drop in fluid pressure when fluid is passed through it. A flow of fluid enters the object 14 through a pipe line 16 and exists into a pipe line 18. It is assumed for descriptive purposes that it is desired to determine the pressure drop across the object 14, and to this end the new and novel device 12 of my invention may be utilized. A first cylinder 20 contains a first piston 22 which divides the cylinder 20 into a low pressure chamber 24 and a high pressure chamber 26. A convolute diaphragm seal 28 along with the piston 22 divides the high pressure chamber 26 from the low pressure chamber 24. The convolute diaphragm seal 28 may be made from any suitable material, such as, for example, rubber, plastic, metal, leather or any other suitable material, or combination of materials and it is secured at its outer edge by the stationary cylinder head 30 as is shown most clearly in FIG. 1. A convolute diaphragm is used because its effective pressure area does not change with movement of the piston. A second cylinder 32 is similarly divided into a differential pressure signal chamber 34 and another chamber 36 by the piston 38 and the convolute diaphragm seal 40. The convolute diaphragm seal 40 is secured at its outer edge by the stationary cylinder head 39. The chamber 36 has free communication with the atmosphere by means of the port 41 as shown most clearly in FIG. 1. The second cylinder 32 is rigidly mounted in tandem and coaxially with the first cylinder 20. In the embodiment shown in FIG. 1, the two cylinders 20 and 32 have a common end-wall 42 through which passes a piston rod 44 rigidly interconnecting the two pistons 22 and 38, so that movement of one will cause a corresponding and equal movement of the other. A fluid tight seal 46 surrounds the piston rod 44 where it passes through the end wall 42 to effectively prevent leakage of any fluid from chamber 24 to 36. The seal 46 may be made from any desired material such as plastic, rubber, cloth or any other suitable material and may be impregnated with any desired material to reduce friction as the piston rod 44 moves through the wall 42, thus providing a virtually friction free movement for the pistons 22 and 38, and reducing friction losses in the device to virtually nothing. The piston members 22 and 38 may be made in any desired size or shape, but for the direct reading of pressure differentials on a standard pressure gauge the face area of the two pistons should be equal.

Because of resistance encountered in flowing through the object 14, fluid flow through the in-line 16 will be at a higher pressure than that through the out-line 18. The high pressure chamber 26 accordingly is connected by a line 48 into the in-line 16, and the low pressure chamber 24 communicates through the line 50 with the out-line 18.

In order that the new and novel device of my invention may be employed to show pressure differences between flow-points in a fluid without entry of that fluid into the cylinder 20, what will be termed "fluid barriers" 52 and 54 may be interposed in the low and high pressure lines 48 and 50 respectively for isolation of the cylinder 20, in this case already filled with a suitable fluid, from the lines 16 and 18 through which the fluid flow occurs. The chances of contamination of the fluid flowing through the lines 16 and 18 thus is minimized, and where that fluid is corrosive the cylinder 20, the piston 22, the convolute diaphragm 28 etc. are protected therefrom. The fluid barriers 52 and 54 transmit fluid pressures from the lines 16 and 18 to the chambers 24 and 26 while preventing any interchange of fluids. The fluid barriers 52 and 54 may take the form of hollow bodies whose interiors are divided by yieldable diaphragms 56 and 58 respectively, chambers 60 and 62 communicating with and filled by fluid from the related lines 16 and 18, and chambers 64 and 66 communicating with and filled with the same fluid as the corresponding cylinder chambers 24 and 26. Whether the fluid barriers are used or not, operation of the new and novel device of my invention is essentially the same in that the first piston 22 is forced towards the second cylinder 32 by a force equal to the difference in pressure across the object 14. This force is transferred through the piston rod 44 to the second piston 38 and through the latter to the fluid which fills the signal chamber 34, and other components which will now be described.

The pressure gauge which has been designated generally by the reference numeral 68 may be of conventional design and contains a Bourdon tube or its equivalent (not shown). The Bourdon tube, connecting line or pipe 70 and signal chamber 34 are filled with a fluid which is at atmospheric pressure when the piston 38 is in a neutral position as shown in FIG. 1. When the pressure differential felt by the first piston 22 is placed, as described above, on the second piston 38, the latter is forced against the fluid in the signal chamber 34 thus raising the pressure in the communicating line or pipe 70 and gauge 68 by an amount corresponding to the difference in pressure between the in-line or pipe 16 and the out-line or pipe 18. This pressure is resisted by the spring force exerted by the Bourdon tube of the gauge 68 and the degree to which the pressure is able to overcome and move the Bourdon tube is registered by an indicator of the gauge 68. To prevent over-pressure damage to the gauge 68 by sudden shock-like pressure rises, the latter may be damped by connecting a hydraulic accumulator into the signal line 70, if desired. The accumulator 72 should be charged to a pressure above the expected range of indications to be obtained from the gauge and its diaphragm so positioned that the accumulator 72 contains no expellable fluid until fluid is forced into it by excessive pressures in the line 70. Such ingress of fluid compresses the air in the accumulator 72 rather than introducing a possibly destructive volume of fluid into the gauge 68. It will be understood, of course, that while the present invention has been described in connection with a pressure indicating device it is not to be so limited and the pressure indicating device 68 may be replaced by a signalling device, a recording device, an actuating or control mechanism or any other desired mechanism, adapted to be actuated by fluid pressure changes.

Figure 2:
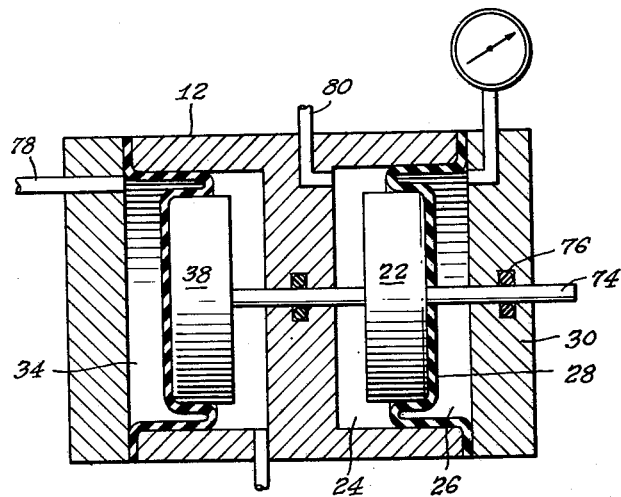
FIG. 2 illustrates a cross-sectional view of a modified form of the invention shown in FIG. 1.

FIG. 2 shows a modified form of the invention shown in FIG. 1 and this device is shown as adding pressures rather than subtracting them. This device 12 has the same essential construction as the device shown in FIG. 1 and described above except that the stationary cylinder wall 30 is pierced by a dummy rod 74 which is surrounded by a fluid tight seal 76. The dummy rod may be attached to the convoluted diaphragm 28 or the piston 22 and has for its purpose reducing the piston face area bounding the chamber 26 and also to provide a visual indication of the position of the pistons 22 and 38. For direct reading of pressures and pressure differentials on a standard pressure gauge the face areas of the pistons 22 and 38 should be equal.

Figure 3:
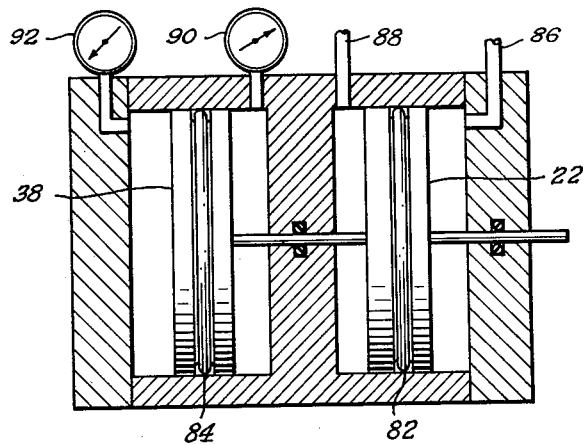
FIG. 3 illustrates a cross-sectional view of another form of my invention.
Figure 4:
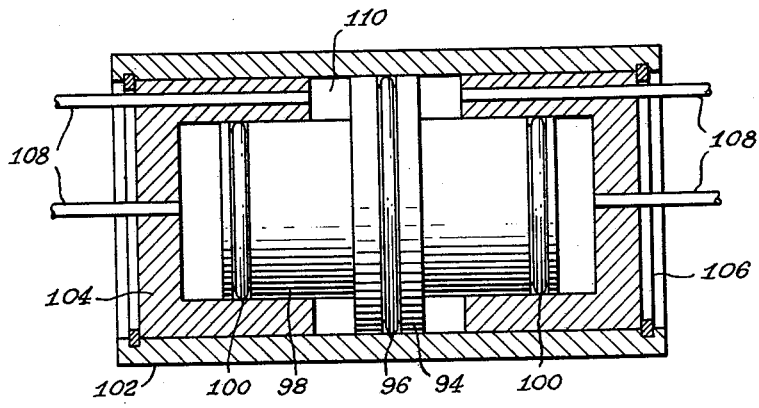
FIG. 4 illustrates a cross-sectional view of yet another form of my invention.

The new and novel device of my invention shown in FIG. 2 operates in the same manner as that described for FIG. 1 with the exception that to add pressures the connections are somewhat different. In this modification a pressure source is connected to chamber 34 by means of a line or pipe 78, and a second pressure to be added to the first is connected to the chamber 24 by means of a line or pipe 80. Here the pressure exerted on the piston 38 through the line 78 moves the piston 38 a certain distance and this also moves the piston 22 the same distance. Pressure through line 80 moves the piston an additional distance and thus the pressure in the now signalling pressure chamber 26 is raised by an amount equal to the sum of these two pressures. It will be understood, of course, that both the devices of my invention, as well as others to be described in connection with FIGS. 3 and 4 are readily adapted to measure the differential or summation of more than two pressures by simply adding additional similar units to those described. It is also to be understood that any of the devices shown and described in connection with FIGS. 1 to 4 inclusive may be made to either add pressures or measure pressure differentials simply by changing the connections to the various chambers as desired.

FIG. 3 shows still another modification of the present invention and has the same general construction and parts as shown and described in FIGS. 1 and 2 with the exception that instead of using convoluted diaphragms 28 and 40, the pistons 22 and 38 carry pistons rings or seals 82 and 84 respectively, said seals being adapted to receive the entire pressures from either direction. FIG. 3 has been illustrated so that the new and novel device of my invention is adapted to measure reversing differential pressures from either direction. When pressure in line 86 exceeds the pressure in line 88 the difference is registered on the gauge 92, and when pressure in line 88 exceeds the pressure in line 86 the difference in pressure is registered on gauge 90, thus providing a means for registering or utilizing reversing differential pressures.

FIG. 4 shows still another form of my new and novel invention in which piston 94 fitted with a seal 96 may be rigidly mounted on a plunger 98 near the center of the plunger's length. Both ends of the plunger 98 being fitted with pressure seals 100. This assembly is encased in a cylinder 102 fitting over the piston 94 and with two smaller bore cylinders 104 which fit over the ends of the plunger 98, said cylinders 104 being retained by rings 106 and being coaxially assembled and having four openings 108 into the four presure chambers thus formed. The annular chambers 110 in which the piston 94 operates may be of any desired area ratio with the plunger cylinders 104, thus with a 1:1 ratio a pressure sum or difference may be read directly on a pressure gauge.

It is to be understood that the forms of the invention herein shown and described are to be taken as preferred and practical embodiments of the same, and that various changes may be made in the shape, size and arrangement of parts without departing from the spirit of the invention or the scope of the appended claims.

Having thus described the invention, what I claim and desire to secure by Letters Patent is:

1. A fluid pressure operated device for deriving a differential pressure measurement from two applied fluid pressures comprising:
   a cylindrical fluid-tight casing having a first and a second cylindrical chamber coaxially aligned and having the same diameter, a first and a second piston connected by a rod, each piston movably located in its respective chamber and having the same diameter;
   a first and a second convolute diaphragm each with its periphery sealed to the respective chamber wall and its center portion capable of resting against the end of the respective piston, opposite the connecting rod end whereby an equal-area fluid-tight seal is provided between each piston and its respective chamber wall;
   means for applying a differential pressure across the first diaphragm in a direction to hold the diaphragm against the first piston;
   means for venting to the atmosphere the portion of the second chamber through which passes the rod;
   means for indicating the pressure within the other portion of the second chamber, which is proportional to the applied differential pressure;
   and means for preventing overpressurization of the indicating means.

2. A fluid pressure operated device for deriving a differential or summation pressure function from two applied fluid pressures comprising:
   a cylindrical fluid-tight casing having a cylindrical chamber whose central portion has a greater diameter than the end portions;
   a piston movably located within and shorter than said central portion;
   a first and a second plunger each movably located in an end portion and integral with the piston;
   ring means for sealing the periphery of the piston whereby said central portion of the chamber is divided into two fluid-tight annular chambers;
   ring means for sealing the periphery of each plunger whereby a fluid-tight compartment is provided at each end portion of the chamber;
   and access means for each fluid-tight annular chamber and compartment.

3. A fluid pressure operated device for deriving a summation or differential function from a number of applied fluid pressures comprising:
   a fluid-tight casing having a first chamber;
   a second chamber,
   a third chamber,
   a fourth chamber, and access means for each chamber;
   a first movable member located between the first and the second chamber, whose position is dependent upon the difference between the pressures of the first and the second chambers and whose effective area is constant regardless of the value of said difference and regardless of said position;
   a second movable member located between the third and the fourth chamber, whose position is dependent upon the difference between the pressures of the third and the fourth chambers and whose effective area is constant regardless of said difference and regardless of said position; and
   motion transmitting means connecting the first and second movable members whereby the pressure of the fourth chamber is an arithmetical function of the applied fluid pressures, said third and fourth chambers being separately sealed and provided with separate pressure indicators whereby the difference between the first and second applied fluid pressures is indicated regardless of which pressure is the greater.

4. The fluid pressure operated device of claim 3 wherein all chambers have the same diameter, and further including a dummy motion transmitting means having the same diameter as the motion transmitting means and extending from the side of the first movable member opposite the side of connection of the motion transmitting means, through the fluid-tight casing, whereby both sides of the first movable member have the same effective area.

References Cited in the file of this patent

UNITED STATES PATENTS

| | | |
|---|---|---|
| 1,992,343 | Ahnstrom | Feb. 26, 1935 |
| 2,286,188 | MacLean | June 16, 1942 |
| 2,527,171 | Allwein | Oct. 24, 1950 |
| 2,604,116 | Bailey | July 22, 1952 |
| 2,767,725 | Long | Oct. 23, 1956 |
| 2,916,205 | Litz | Dec. 8, 1959 |
| 2,981,058 | Reed | Apr. 25, 1961 |